(12) United States Patent
Gu

(10) Patent No.: US 6,464,029 B2
(45) Date of Patent: Oct. 15, 2002

(54) ELECTRICAL TWIST VEHICLE

(75) Inventor: Hong-Jiun Gu, Taipei (TW)

(73) Assignees: Jar Chen Wang, Cerritos, CA (US); Hong Juin Gu, Taipei (TW)

( * ) Notice: Subject to any disclaimer, the term of this patent is extended or adjusted under 35 U.S.C. 154(b) by 0 days.

(21) Appl. No.: 09/910,615

(22) Filed: Jul. 23, 2001

(65) Prior Publication Data

US 2001/0051489 A1 Dec. 13, 2001

(30) Foreign Application Priority Data

Jun. 9, 2000 (TW) ..................................... 89215434 U

(51) Int. Cl.$^7$ ............................. A63H 17/00; B60K 1/00
(52) U.S. Cl. ..................................... 180/65.6; 446/463
(58) Field of Search ............................... 446/460, 463, 446/465, 466; 74/421 A, 405, 473.37; 180/65.6; 280/218

(56) References Cited

U.S. PATENT DOCUMENTS

| 4,200,304 A | * | 4/1980 | Hwang | 280/218 |
| 4,484,649 A | * | 11/1984 | Kennedy et al. | 180/206 |
| 4,560,022 A | * | 12/1985 | Kassai | 180/336 |
| 4,976,650 A | * | 12/1990 | Watanabe | 446/144 |
| 5,699,869 A | * | 12/1997 | Fritzinger et al. | 180/65.5 |
| 6,386,304 B1 | * | 5/2002 | Wang | 180/65.1 |

* cited by examiner

Primary Examiner—Jacob K. Ackun
Assistant Examiner—Faye Francis
(74) Attorney, Agent, or Firm—Raymond Y. Chan; David and Raymond Patent Group

(57) ABSTRACT

The present invention relates to a motorized multi functional twist vehicle assembly that can be operated either by a user's twisting motion or by a motor. The main structure is a seat that also is the car body. In the front portion of the seat is a drive wheel assembly attached to the seat and the rear portion of the seat has rear wheels attached to the wheel shaft. The rear wheels have a wheel shaft and a clutch gear slideably attached to the wheel shaft. The clutch gear can be moved so as to engage and disengage a drive gear that is attached to a power motor assembly. A switching lever that controls the clutch arm is located on top of the seat. The meshing of the two gears can be done easily with the switching lever. In addition, the exact placement of the clutch gear and the drive gear for connecting and disconnecting can be achieved by the clutch arm or any other means of limiting the motion of the clutch gear.

3 Claims, 5 Drawing Sheets

ELECTRICAL TWIST VEHICLE

BACKGROUND OF THE PRESENT INVENTION

Because a common twist vehicle is normally operated manually, and enticement is needed to combat a child's short attention span, it is critical that the twist vehicle is multi-functional and with many features built in it. The present invention not only provides the traditional manual powered movement, but also has an "auto drive" feature that is achieved by incorporating a power drive unit to drive the wheels. As a result, this dual feature can attract users of different ages to purchase the electrical twist vehicle.

FIELD OF THE INVENTION

The present invention relates to an electrical twist vehicle, more specifically, an electrical twist vehicle that can be either manually powered or electrically powered. By using a clutch assembly operated through a switching lever, the rear wheels can be either engaged or disengaged with the power motor assembly.

SUMMARY OF THE PRESENT INVENTION

Because the common twist vehicle is operated manually and in order to satisfy and entice children's short attention span, it is critical that the twist vehicle is multi-functional and with many features built in it. The present invention not only provides the traditional manual powered movement, but also has a auto drive feature that is achieved by incorporating a power drive unit to drive the wheels. As a result, this dual feature can attract children of different ages to purchase the twist vehicle.

Thus, the main object of the present invention is to provide a multi-functional electrical twist vehicle that can be operated either by user's twisting motion or by a motor. The main structure is a seat that also is the car body, and in the front portion of the car body seat is a drive wheel assembly attached to the car body seat, and a set of rear wheels attached to a rear portion of the car body. The distinguishing point about the present invention is that the rear wheels have a wheel shaft and a clutch gear slideably attached to the wheel shaft. The clutch gear can be moved so as to engage and disengage with a drive gear that is attached to a power motor assembly. A switching lever that controls the clutch arm is located on top of the seat.

Furthermore, because the present invention is a mechanical assembly of a toy designed for young children, therefore another objective is to eliminate the need for tight tolerance in meshing and exact placement of the gears. So long as the meshing can be done easily with the switching lever, then the meshing of the two gears is considered proper. In addition, the exact placement of the clutch gear and the drive gear for connecting and disconnecting can be achieved either by the clutch arm or any other means of limiting the movement of the clutch gear.

DETAILED DESCRIPTION OF THE PREFERRED EMBODIMENT

Figure 1:
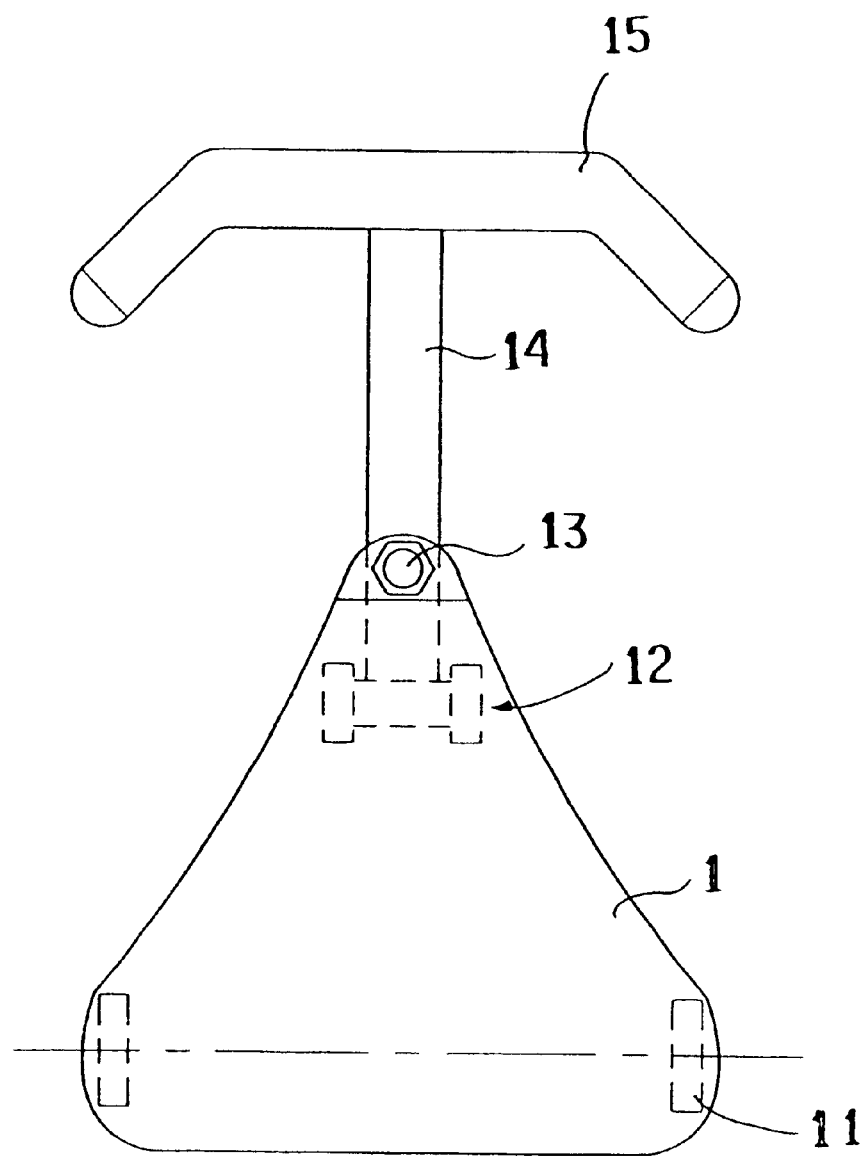
FIG. 1 is a perspective view of a common twist vehicle

Referring to FIG. 1, a rear portion of a common twist vehicle's seat 1 has a set of rear wheels 11. The front portion of the twist vehicle has a drive wheel assembly 12. The drive wheel assembly 12 pivots around a pivotal stem 13, and the drive wheel assembly connects directly to a swing rod 14. The other free end of the swing rod is connected to a handle bar 15. When an operator sits on top of the seat 1, the operator's hand can grab on to the handle bar 15 and proceed to swing the swing rod 14. As a result, the drive wheel assembly is rocked left and right, thus creating a forwardly motion.

Figure 2:
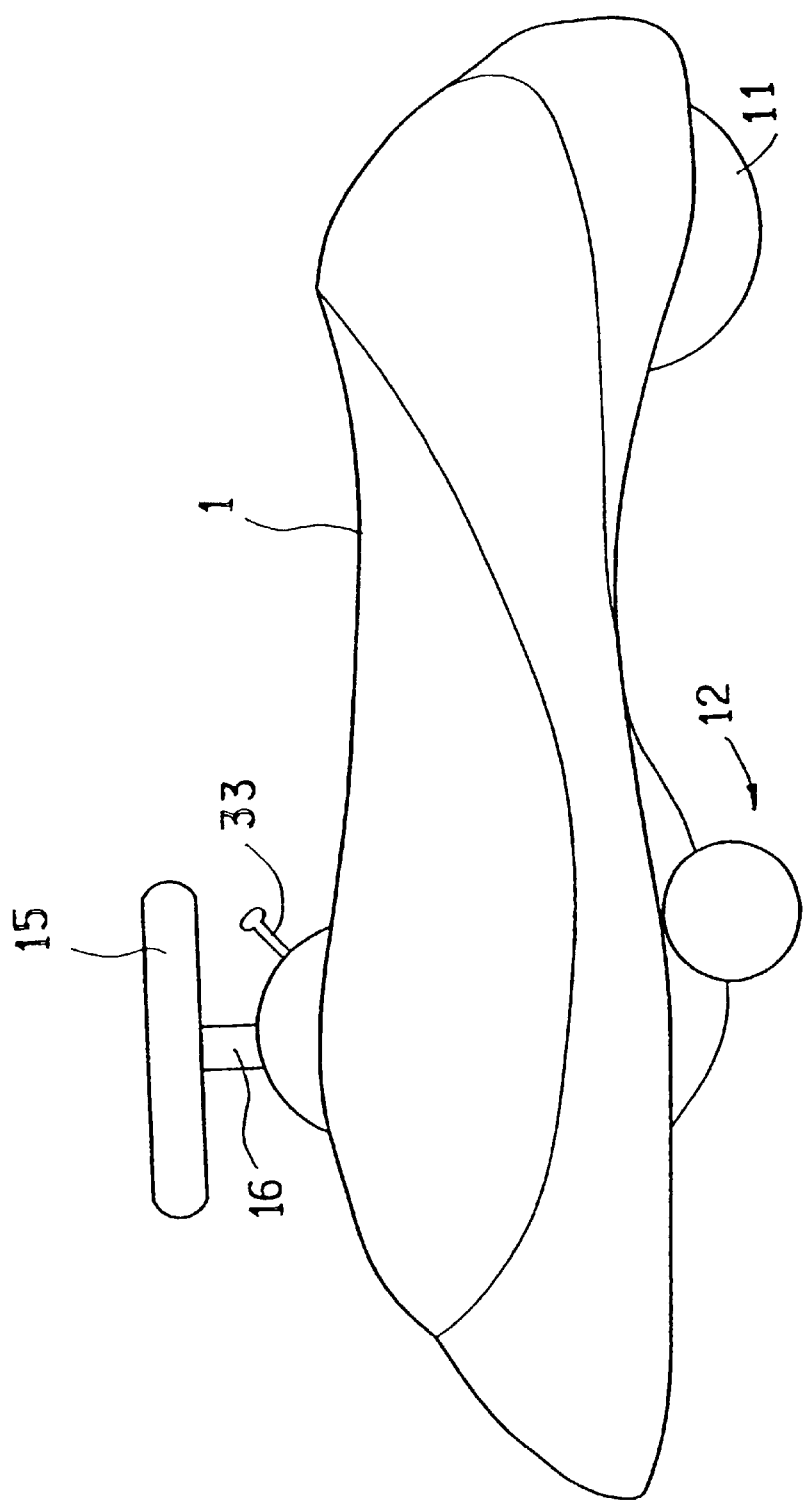
FIG. 2 is a side view of a first embodiment of an electrical twist vehicle of the present invention.
Figure 3:
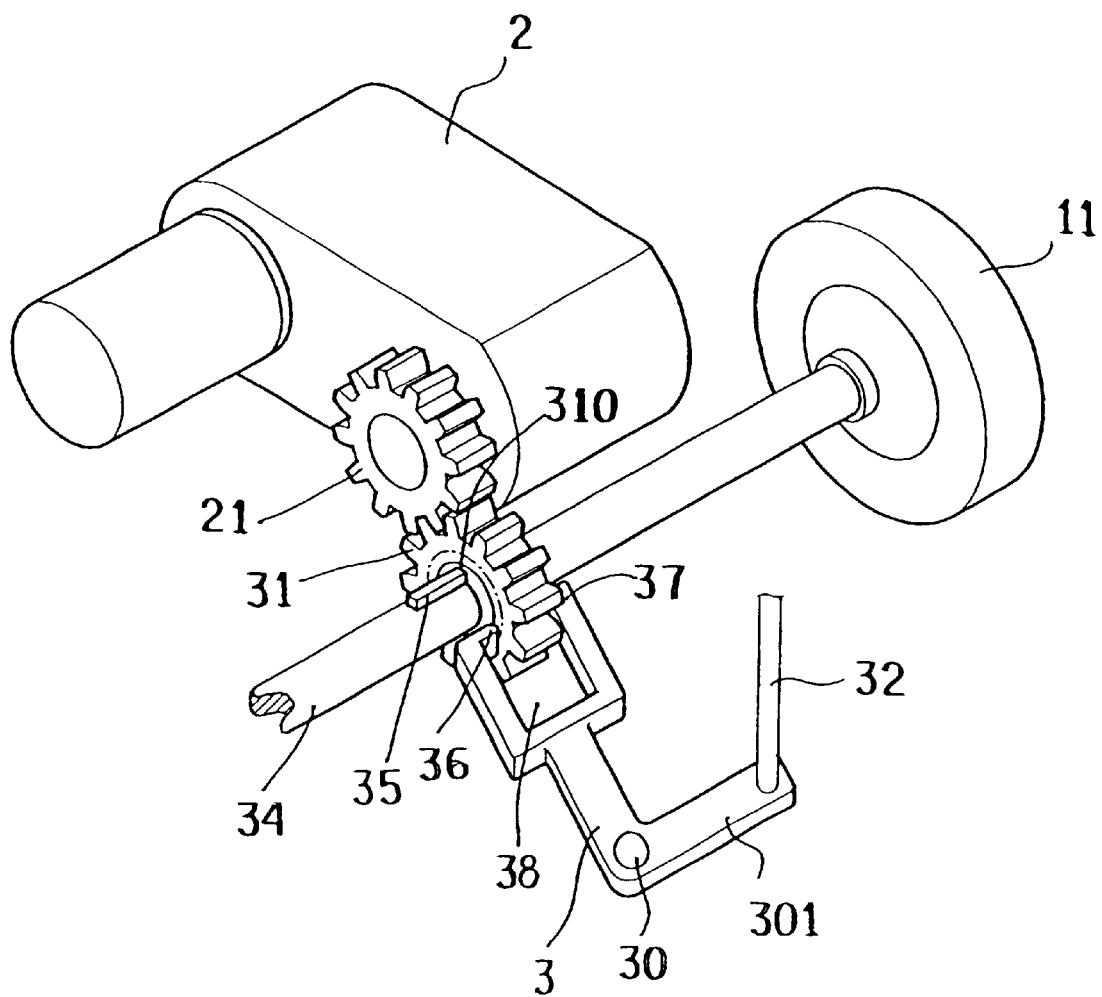
FIG. 3 is a perspective view of the first embodiment of an electrical twist vehicle of the present invention.

Referring to FIG. 2, the present invention comprises an integral car body seat 1, where the front lower portion of the car body seat 1 has a drive wheel assembly 12 attached to it. The drive wheel assembly 12 is connected directly to a steering shaft 16 and the steering shaft 16 is also connected to a handle bar 15 at an end opposite to the end connecting to the drive wheel assembly 12. The rear portion of the seat 1 has a set of rear wheels 11 attached to it. A switching lever 33 is located near where the steering shaft 16 protrudes out of the car body seat 1. The switching lever 33 operates a clutch arm 3 (as shown in FIG. 3) in order to engage or disengage the power coupling between a power motor assembly 2 and the rear wheels 11. The operator can simply select a manual mode by moving the switching lever 33 to separate the mesh between a drive gear 21 that is on the power motor assembly 2 and a clutch gear 31 on the wheel shaft 34, and causing the rear wheels 11 to spin freely. When the operator wants to revert back to the powered mode, she can also simply move the switching lever 33 to shift the clutch gear 31 to mesh with the drive gear 21 on the power motor assembly 2, thereby restoring the power to drive the rear wheels 11. The steering can be achieved by steering the drive wheel assembly 12 in order to turn the car body seat 1 while operating.

Referring to FIG. 3, the power motor assembly 13 is located under the car body seat 1. Opposite to the rear wheels' 11 wheel shaft 34 is a drive gear 21 that is attached to the motor power assembly 2. At the opposite end to the drive gear 21 location is the location of the clutch gear 31. The clutch gear 31 is slideably connected to the wheel shaft 34 and limited to a distance that is enough to disengage the drive gear 21 and the clutch gear 31. The clutch gear 31 has a square key groove 310 and tangentially touches the inner circumference of the clutch gear 31 and the key groove 310 matches a square key 35 that is located on the outer surface of the wheel shaft 34. Thus, the clutch gear 31 can traverse along the length of the square key 35 of the wheel shaft 34.

Referring to FIG. 2, the clutch gear 31 can be moved by using a clutch arm 3 to move the clutch gear 31 along the square key 35 of the wheel shaft 34. The clutch arm 3 is a two-ended L-shaped arm with a rotating point 30 at the bend of the arm. A free end of a rocking arm 301 of the clutch arm 3 is connected to a linkage assembly 32. The switching lever 33 also connects to the linkage assembly 32 and thus allows the user to selectively engage the clutch gear 31. The other end of the clutch arm 3 is connected to a U-shaped clutch-gear pusher 38. The two prongs of the U-shaped clutch-gear pusher 38 has a set of clutch-gear pushing nods 36, 37 located at a gear contacting side of the prongs so that the nods are pointing to each other. The clutch-gear pushing nods 36, 37 are further oriented so that they are in contact with the two side surfaces of the clutch gear 31. As a result, the clutch-gear pushing nods 36,37 can push the sides of the clutch gear 31 in order to selectively engage the meshing of the clutch gear 31 with the drive gear 21 by sliding the clutch gear 31 along the square key 35 of the wheel shaft 34 (see FIG. 4 and FIG. 5).

Figure 4:
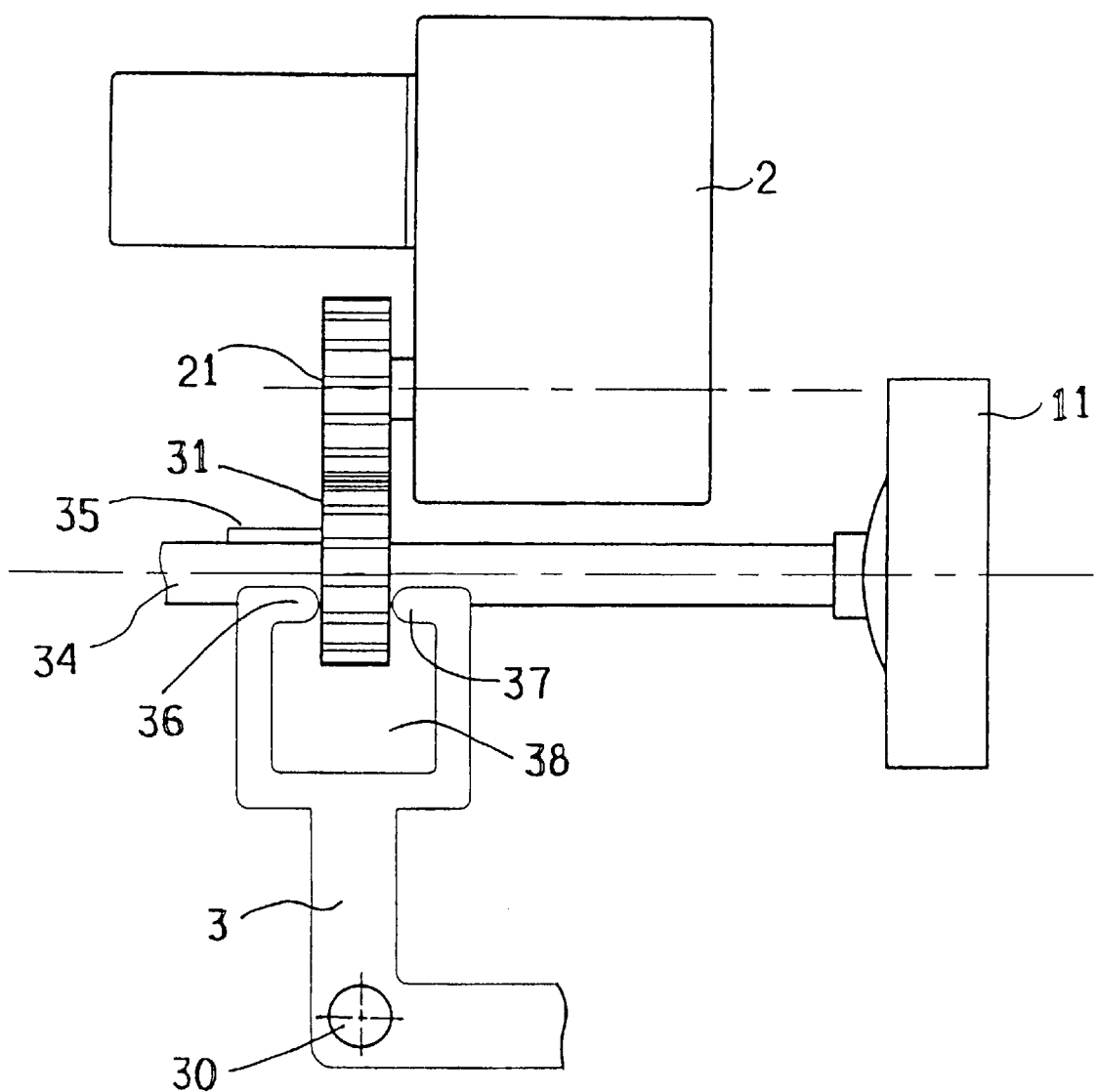
FIG. 4 is a first perspective view of the first embodiment of an electrical twist vehicle of FIG. 5 is a second perspective view of the first embodiment of an electrical twist vehicle of the present invention showing a rear drive shaft connection arrangement.

FIG. 4 shows the meshing of clutch gear 31 with the drive gear 21. The rotational force of the motor is transmitted from the drive gear 21 to the clutch gear 31 and further rotates the square key 35 of the wheel shaft 34, which connects directly to the two rear wheels 11. Thus, the power from the power motor assembly 2 can effectively transmit its rotational force to the two rear wheels 11 and thereby drive the twist vehicle forward. When the twist vehicle is in manual operation, the vehicle can move forward by twisting the drive wheel 12 (see FIG. 2). However, if the rear wheels 11 are still connected to the power motor assembly 2, the frictional force generated by the motor assembly 2 and clutch assembly will likely overcome the resulting forward force. Thus, the connection between the rear wheels 11 and the power motor assembly 2 must be detached when the vehicle is in manual operation.

Figure 5:
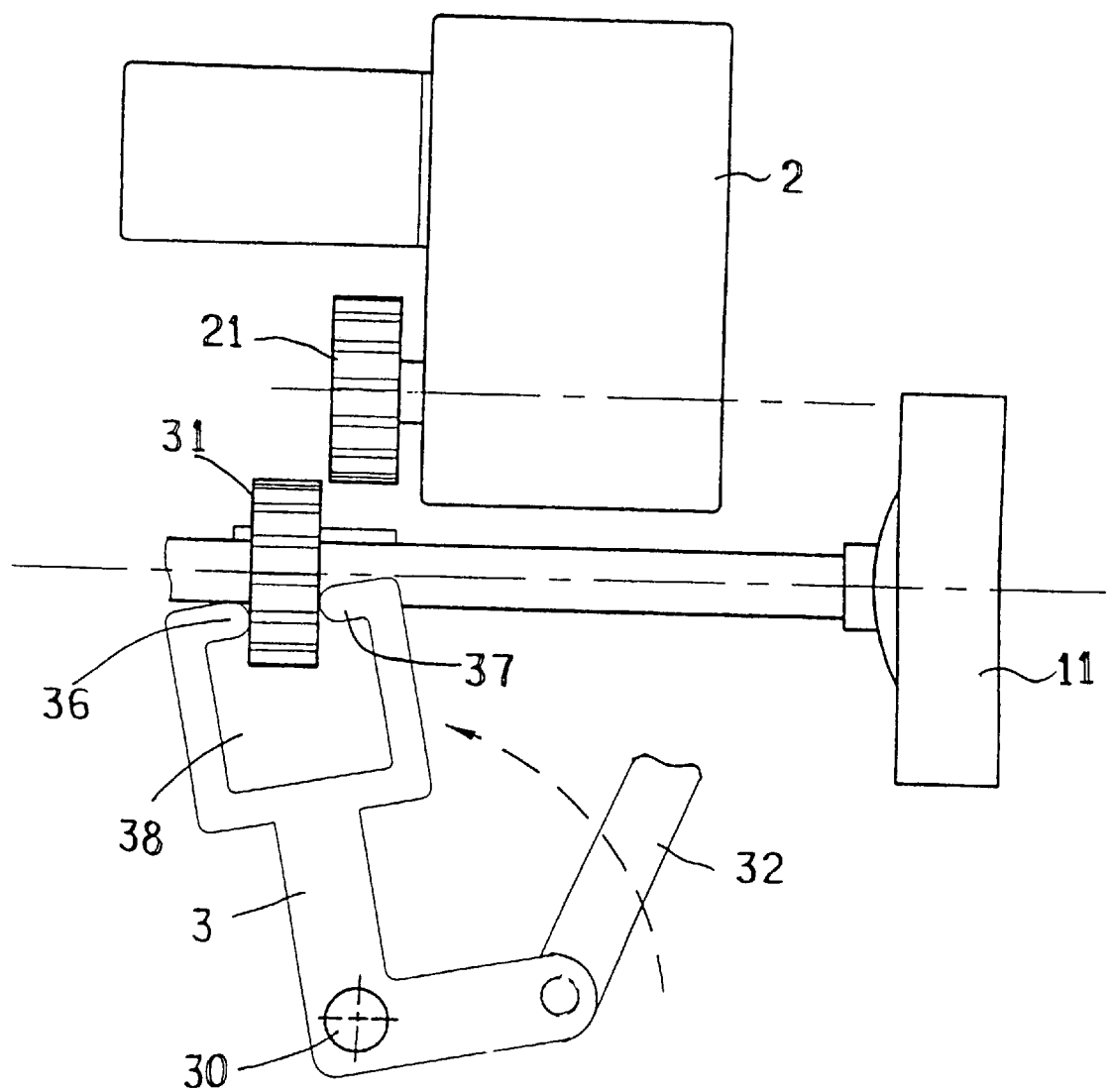

FIG. 5 shows a schematic of the clutch gear 31 being separated from the drive gear 21, effectively disconnecting the power motor assembly 2 with the rear wheels 11. The separation is done by moving the linkage assembly 32 which in turn moves the clutch arm 3 and physically separates the clutch gear 31 from meshing with drive gear 21. The actual manner of separating the two gears is done by the clutch-gear pushing nods 36, 37 of the U-shaped clutch-gear pusher 38 pushing against the sides of the clutch gear 31. When the operator selects the manual mode, the clutch arm 3 pivots around the rotating point 30 and the right clutch-gear pushing nod 37 can push against the right side of the clutch gear 31 to cause it to unmesh with the drive gear 21.

Referring to FIG. 4, the remeshing of the clutch gear 31 and the drive gear 21 can be achieved by the same procedure as described above and the left clutch-gear pushing nod 36 of the U-shaped clutch-gear pusher 38 will push against the left side of the clutch gear 31 and cause the two gears to mesh.

What is claimed is:

1. An electric twist vehicle comprising:
   a car body seat with a front end and a rear end;
   a drive wheel assembly rotatably attached to said front end of said car body seat;
   a steering assembly connected to said drive wheel assembly, wherein said steering assembly comprises a steering shaft having two ends with a first end connecting to a handle bar a second end connecting to said drive wheel assembly;
   a wheel shaft of a predetermined diameter with two ends rotatably connecting to a rear portion of said car body seat, wherein said wheel shaft having a square key of a predetermined length being axially, fixedly, and circumferencially connecting to said rear end of said car body seat at a mid portion of said wheel shaft;
   at least two wheels fixedly connected to each end of said wheel shaft;
   a power motor assembly fixedly connected to said rear portion of said car body seat; and
   a clutch means connecting said power motor assembly to said wheel shaft for selectively transmitting said power motor assembly's rotational power to said wheel shaft through said clutch means.

2. The electrical twist vehicle as recited in claim 1, further comprising a drive gear rotatably connected to said power motor assembly and said clutch means further comprising a clutch gear with a predetermined inner diameter having a square key groove defined in an inner circumference of said clutch gear wherein said clutch gear slideably and axially connects to said square key of said wheel shaft for meshing and unmeshing with said drive gear of said power motor assembly.

3. The electrical twist vehicle as recited in claim 1, wherein said clutch means further comprises a clutch arm having two ends and pivotally connected to said seat at a pivot point location on said clutch arm, wherein one end of said clutch arm being fixedly connected to a U-shaped gear pusher, said U-shaped clutch gear pusher having two prongs with a clutch contacting surface and an outer surface, wherein said clutch contacting surface having one clutch gear pushing nod located at each of said prongs on said clutch contacting side of said prongs of said U-shaped clutch-gear pusher and another end of said clutch arm being moveably connected to a linkage assembly, wherein said linkage assembly being connected to a switching lever located on said car body seat.

* * * * *